United States Patent
Hainberger et al.

(10) Patent No.: US 8,078,026 B2
(45) Date of Patent: Dec. 13, 2011

(54) DEVICE FOR CANCELING THE WAVELENGTH DEPENDENCE OF THE NONLINEARITY COEFFICIENT OF MICROSTRUCTURED FIBERS

(75) Inventors: Rainer Hainberger, Vienna (AT); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 595 days.

(21) Appl. No.: 10/999,059

(22) Filed: Nov. 30, 2004

(65) Prior Publication Data

US 2005/0220431 A1  Oct. 6, 2005

(30) Foreign Application Priority Data

Mar. 30, 2004 (JP) ................... 2004-101411

(51) Int. Cl.
*G02B 6/00* (2006.01)
*G02B 6/02* (2006.01)
*G02B 6/028* (2006.01)

(52) U.S. Cl. ................... 385/122; 385/123; 385/124
(58) Field of Classification Search ........... 385/122–124
See application file for complete search history.

(56) References Cited

U.S. PATENT DOCUMENTS

| | | | |
|---|---|---|---|
| 5,559,921 A * | 9/1996 | Terasawa et al. | 385/124 |
| 6,421,169 B1 | 7/2002 | Bonnedal et al. | |
| 6,567,777 B1 * | 5/2003 | Chatterjee | 704/246 |
| 6,690,505 B1 | 2/2004 | Ye | |
| 6,859,598 B2 | 2/2005 | Hasegawa et al. | |
| 6,954,575 B2 | 10/2005 | Fermann et al. | |
| 7,110,649 B2 | 9/2006 | Hisatomi et al. | |
| 7,257,302 B2 | 8/2007 | Fermann et al. | |
| 7,403,689 B2 | 7/2008 | Koch, III et al. | |
| 2002/0168161 A1 * | 11/2002 | Price et al. | 385/123 |
| 2002/0186460 A1 | 12/2002 | Lelic | |
| 2004/0052534 A1 | 3/2004 | Joergensen | |
| 2004/0105640 A1 * | 6/2004 | Hasegawa | 385/125 |
| 2004/0218879 A1 * | 11/2004 | Epworth et al. | 385/122 |

FOREIGN PATENT DOCUMENTS

EP  0 570 941  11/1993
(Continued)

OTHER PUBLICATIONS

Ohlen et al., "Wavelength Dependence and Power Requirements of a Wavelength Converter Based on XPM in a Dispersion-Shifted Optical Fiber", IEEE Photonics Technology Letters, vol. 12, No. 5, May 2000, pp. 522-524.*

(Continued)

Primary Examiner — Ryan Lepisto
Assistant Examiner — Jerry Blevins
(74) Attorney, Agent, or Firm — Staas & Halsey LLP

(57) ABSTRACT

Since the magnitude of a nonlinear effect depends on the nonlinearity coefficient of the microstructured fiber and the intensity of pump light, either the nonlinearity coefficient or the intensity of pump light are adjusted. The nonlinearity coefficient is modified by introducing a nonlinear refractive index profile that has the inverse characteristic of the intensity distribution of either the pump or the signal light. The intensity of the pump light is adjusted by an optical amplifier, an optical attenuator, or a pre-emphasizing filter under the control of a control unit. The control unit controls the intensity of the pump light based on a look-up table which is prepared in advance by experiment or calculation, or based on a function of the pump and signal wavelength.

19 Claims, 16 Drawing Sheets

FOREIGN PATENT DOCUMENTS

| | | |
|---|---|---|
| EP | 1 160 595 | 12/2001 |
| EP | 1 184 943 A1 | 3/2002 |
| EP | 1 271 813 A2 | 1/2003 |
| EP | 1 507 154 A1 | 2/2005 |
| JP | 2002-31737 | 1/2002 |
| JP | 2002-323636 | 11/2002 |
| JP | 2003-337239 | 11/2003 |
| JP | 2004-522195 | 7/2004 |
| JP | 2005-31687 | 2/2005 |
| JP | 2005-525602 | 8/2005 |
| JP | 2005-538029 | 12/2005 |
| JP | 2006-526896 | 11/2006 |
| JP | 2007-511919 | 5/2007 |
| WO | WO 02/14944 | 2/2002 |
| WO | WO-0214944 A1 * | 2/2002 ........................ 398/5 |
| WO | 02/084350 A1 | 10/2002 |
| WO | WO 02/084821 | 10/2002 |
| WO | 03/098342 A1 | 11/2003 |
| WO | WO 03/098342 | 11/2003 |

OTHER PUBLICATIONS

Jesper Laegsgaard et al., "Doped photnic bandgao fibers for short-wavelength nonlinear devices", Optics Letters, vol. 28, No. 10, May 15, 2003, pp. 783-785.

K. Nakajima et al., "Dopant dependence of effective nonlinear refractive index in GE02- and F-doped coare single-mode fibers", IEEE Photonics Technology Letter, IEEE Inc., New York, vol. 14, No. 4, Apr. 2002, pp. 492-494, XP002289452.

T. Kato et al., "Estimation of Nonlinear Refractive Index in Various Silica-Based Glasses for Optical Fibers", Optics Letters, Optical Society of America, Washington, vol. 20, No. 22, Nov. 15, 1995, pp. 2279-2281, XP000537153.

A.K. Gathak et al., "Design of Waveguide Refractive Index Profile to Obtain Flat Modal Field", Proceedings of the SPIE, vol. 3666, 1998, pp. 40-44, XP002328355.

Search Report for corresponding European Appln. No. 04026807.0 dated Jun. 9, 2005.

Jesper Laegsgaard et al., "Doped photnic bandgao fibers for short-wavelength nonlinear devices", Optics Letters, vol. 28, No. 10, May 15, 2003, pp. 783-785.

Nakajima K. et al., "Dopant dependence of effective nonlinear refractive index in GE02- and F-doped coare single-mode fibers", IEEE Photonics Technology Letter, IEEE Inc., New York, vol. 14, No. 4, Apr. 2002, pp. 492-494, XP002289452.

Kato T. et al., "Estimation of Nonlinear Refractive Index in Various Silica-Based Glasses for Optical Fibers", Optics Letters, Optical Society of America, Washington, vol. 20, No. 22, Nov. 15, 1995, pp. 2279-2281, XP000537153.

A.K. Gathak et al., "Design of Waveguide Refractive Index Profile to Obtain Flat Modal Field", Proceedings of the SPIE, vol. 3666, 1998, pp. 40-44, XP002328355.

Price J H V et al., "A tunable femtosecond pulse source operating in the range 106-1.33 microns based on an Yb doped holey fiber amplifier", Conference on Lasers and Electro-Optics. (CLEO 2001). Technical Digest. Postconference Edition. Baltimore, MD, May 6-11, 2001, Trends in Optics and Photonics (TOPS), US, Washington, WA: OSA, US, vol. 56, May 6, 2001, pp. CPD1-1.

Öhlén P. et al., "Wavelength Dependence and Power Requirements of a Wavelength Converter Based on XPM in a Dispersion-Shifted Optical Fiber", IEEE Photonics Technology Letters, IEEE Inc., New York, US, vol. 12, No. 5, May 2000, pp. 522-524.

Ju Han Lee et al., "A holey fiber based WDM wavelength converter incorporating an apodized fiber bragg grating filter", Conference on Lasers and Electro-Optics (CLEO 2002). Technical Digest. Postconference Edition. Long Beach, CA, May 19-24, 2002, Trends in Optics and Photonics (TOPS), Washington, WA: OSA, US, vol. 73, May 19, 2002, pp. 739-741.

Ju Han Lee et al., "Four-Wave Mixing Based 10-GB/S Tunable Wavelength Conversion Using a Holey Fiber With a High SBS Threshold", IEEE Photonics Technology Letters, IEEE Inc., New York, US, vol. 15, No. 3, Mar. 2003, pp. 440-442.

Ju Han Lee et al., "A Tunable WDM Wavelength Converter Based on Cross-Phase Modulation Effects in Normal Dispersion Holey Fiber", IEEE Photonics Technology Letters, IEEE Inc., New York, US, vol. 15, No. 3, Mar. 2003, pp. 437-439.

Rau L et al., "Simultaneous All-Optical Demultiplexing of a 40-GB/S Signal to 4 X 10 GB/S WDM Channels Using an Ultrafast Fiber Wavelength Converter", IEEE Phonotics Technology Letters, IEEE Inc., New York, US, vol. 14, No. 12, Dec. 2002, pp. 1725-1727.

Abedin Kazi S. et al., "Highy nondegenerate femtosecond four-wave mixing in tapered microstructure fiber", Applied Physics Letters, American Institute of Physics, New York, US, vol. 81, No. 8, Aug. 19, 2002, pp. 1384-1386.

Patent Abstracts of Japan, vol. 2000, No. 08, Oct. 6, 2000, & JP 2000 151515, May 20, 2000.

Heston M L et al., "Use of the acousto-optic tunable filter for optical spectrum analysis and EDFA power equalization in WDM systems", Optical Fiber Communications, 1996, OFC '96 Feb. 25-Mar. 1, 1996, Piscataway, NJ, USA, IEEE 25, Feb. 1996, p. 249-250.

Jung Mi Oh et al., "Demonstration of Highly Efficient Flat-Gain L-Band Erbium-Doped Fiber Amplifiers by Incorporating a Fiber Bragg Grating", IEEE Photonics Technology Letters, IEEE Inc., New York, US, vol. 14, No. 9, Sep. 2002, pp. 1258-1260.

Ahderom S. et al., "Applications of liquid crystal spatial light modulators in optical communications", High Speed Networks and Multimedia Communications 5$^{th}$ IEEE International Conference on Jul. 3-5, 2002, Piscataway, NJ, USA, IEEE, Jul. 3, 2002, pp. 239-242.

Wada S et al., Optical Society of America / Institute of Electrical and Electronics Engineers: "Variable gain equalizer using magneto-optics", Optical Fiber Communication Conference and Exhibit (OFC), Technical Digest, Anaheim, CA, Mar. 17-22, 2002, Trends in Optics and Photonics Series (TOPS), Washington, DC, OSA, US, vol. TOPS, vol. 70, Mar. 17, 2002, pp. 324-326.

Kyo Inoue et al., "Tunable Gain Equalization Using a Mach-Zehnder Optical Filter in Multistage Fiber Amplifiers", IEEE Photonics Technology Letters, IEEE Inc., New York, US, vol. 3, No. 8, Aug. 1, 1991, pp. 718-720.

Search Report for corresponding European Appln. No. 04026807.0 dated Sep. 23, 2005.

J. H. Lee et al., "A Tunable WDM Wavelength converter Based on Cross-Phase Modulation Effects in Normal Dispersion Holey Fiber", IEEE Photonics Technology Letter vol. 15, No. 3, pp. 437-439, Mar. 2003.

J. H. Lee et al., "Four-Wave Mixing Based 10-Bd/s Tunable Wavelength Conversion Using a Holey Fiber with a High SBS Threshold", IEEE Photonics Technology Letters vol. 15, No. 3, pp. 440-442, Mar. 2003.

"Nonlinear Fiber Optics", Academic Press, 2$^{nd}$ Edition, 1995.

T. Kato et al., "Estimation of Nonlinear Refractive Index in Various Silica-based Glasses for Optical Fibers", Optics Letters, vol. 20, No. 22, pp. 2279-2281.

G. Agrawal, "Nonlinear Fiber Optics", Academic Press, 2$^{nd}$ Edition, Ch. 10, pp.

European Search Report dated Nov. 29, 2006 in corresponding European Application No. 06 01 8850.

"Tunable Gain Equalization Using a Mach-Zehnder Optical Filter in Multistage Fiber Amplifiers", Kyo Inoue et al., IEEE Photonics Technology Letters, vol. 3, No. 8, Aug. 1991, pp. 718-720.

"Variable Gain Equalizer Using Magneto-Optics", S. Wada et al., Optical Fiber Communication Conference and Exhibit (OFC), vol. 70, Mar. 17, 2002, pp. 324-326.

"Applications of Liquid Crystal Spatial Light Modulators in Optical Communications", S. Ahderom et al., IEEE, Jul. 3, 2002, pp. 239-242.

"Demonstration of Highly Efficient Flat-Gain L-Band Erbium-Doped Fiber Amplifiers by Incorporating a Fiber Bragg Grating", Jung Mi Oh et al., IEEE Photonics Technology Letters, vol. 14, No. 9, Sep. 2002, pp. 1258-1260.

"Use of the acousto-optic tunable filter for optical spectrum analysis and EDFA power equalization in WDM systems", M. L. Heston et al., IEEE, Feb. 25, 1996, pp. 249-250.

"Highly nondegenerate femtosecond four-wave mixing in tapered microstructure fiber", Kazi S. Abedin et al., Applied Physics Letters, vol. 81, No. 8, Aug. 19, 2002, pp. 1384-1386.

"Simultaneous All-Optical Demultiplexing of a 40-Gb/s Signal to 4 × 10 Gb/s WDM Channels Using an Ultrafast Fiber Wavelength Converter", Lavanya Rau et al., IEEE Photonics Technology Letters, vol. 14, No. 12, Dec. 2002, pp. 1725-1727.

"A holey fiber based WDM wavelength converter incorporating an apodized fiber Bragg grating filter", Ju Han Lee et al., Conference on Lasers and Electro-Optics, vol. 73, May 19, 2002, pp. 739-741.

Z. Yusoff et al., "Raman effects in a highly nonlinear holey fiber: amplification and modulation", Optics Letters, vol. 27, No. 6, Mar. 15, 2002, p. p. 424-426.

Communication from the European Patent Office for corresponding European Application No. 06 018 850.5-2216, dated Aug. 30, 2007.

Japanese Office Action mailed Oct. 20, 2009 and issued in corresponding Japanese Patent Application 2004-101411.

"Theoretical Investigation of 8 × 10 10-Gb/s WDM Signal Transmission Performance Based on Gain-Equalized SOAs Using Backward Pumping at DCF", Sub Hur et al., Journal of Lightwave Technology, 21, 6, Jun. 2003, pp. 1499-1503.

European Office Action dated Apr. 23, 2010 and issued in corresponding European Patent Application 06 018 850.5.

European Office Action for corresponding European Application 04 026 807.0-2216; mailed Nov. 7, 2008.

M. E Marhic et al. "Broadband fiber-optical parametric amplifiers and wavelength converters with low-ripple Chebyshev gain spectra"; Optics Letters, vol. 21, No. 17; Sep. 1, 1996 (pp. 1354-1356).

Z. Yusoff et al. "Raman effects in a highly nonlinear fiber: amplification XP-001117238 and modulation";Optics Letters, vol. 27, No. 6; Mar. 16, 2002 (pp. 424-426).

L.F. Mollenauer et al. "Time-division multiplexing of pump wavelengths to achieve ultrabroadband, flat, backward-pumped Raman gain"; Optics Letters, vol. 27, No. 8; Apr. 15, 2002 (pp. 592-594).

T.M. Monro et al. "Chaicogenide holey fibres"; Electronics Letters; vol. 36, No. 24; Nov. 23, 2000 (2 pages).

R. Tang et al. "Microstructure-fibre-based optical parametric amplifier with gain slope of ~200 dB/W/km in the telecom range"; Electronic Letters; vol. 39, No. 2; Jan. 23, 2003 (2 pages).

European Office Action for corresponding European application 07 021 081.0-2216; dated May 20, 2010.

* cited by examiner

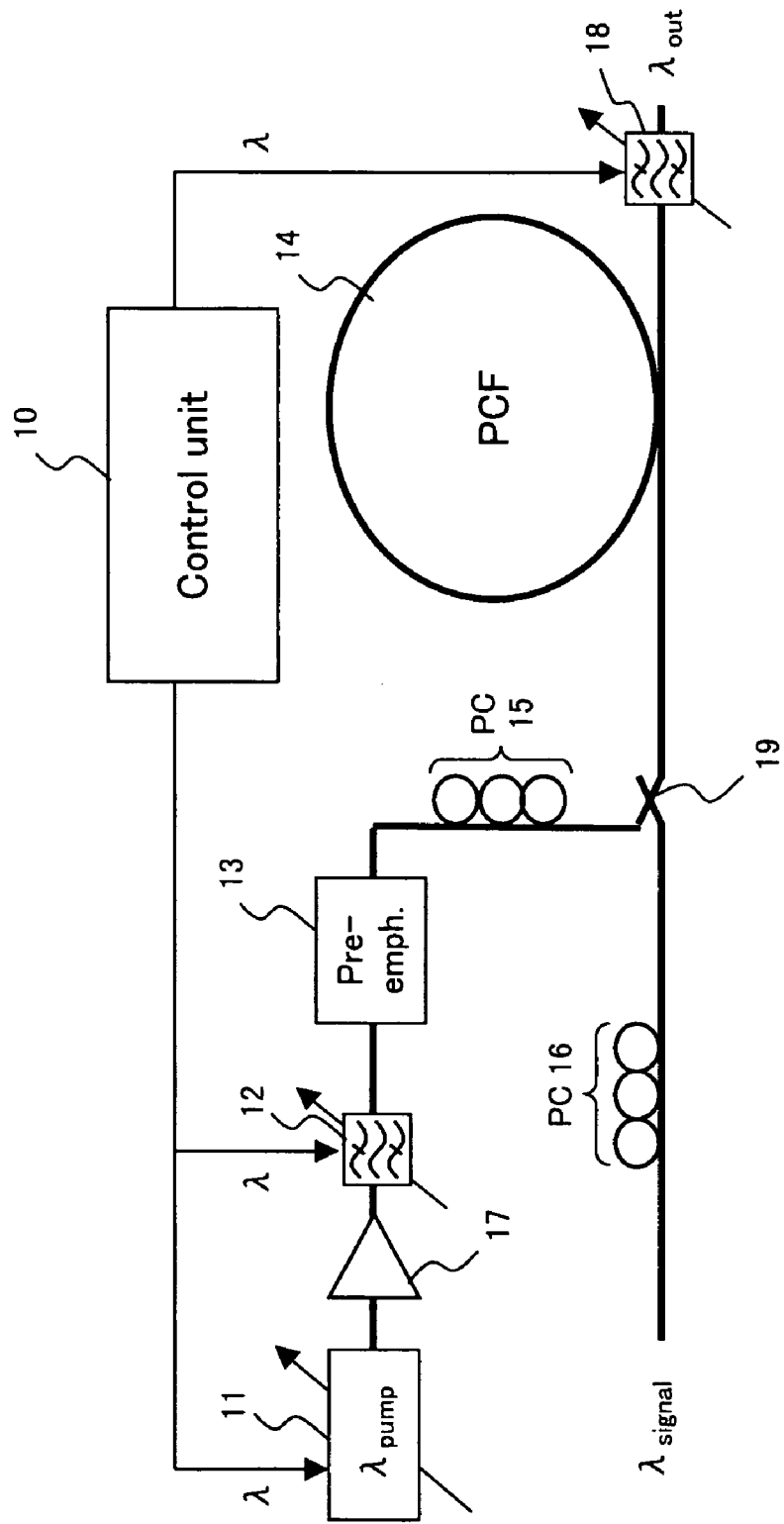
F I G. 5

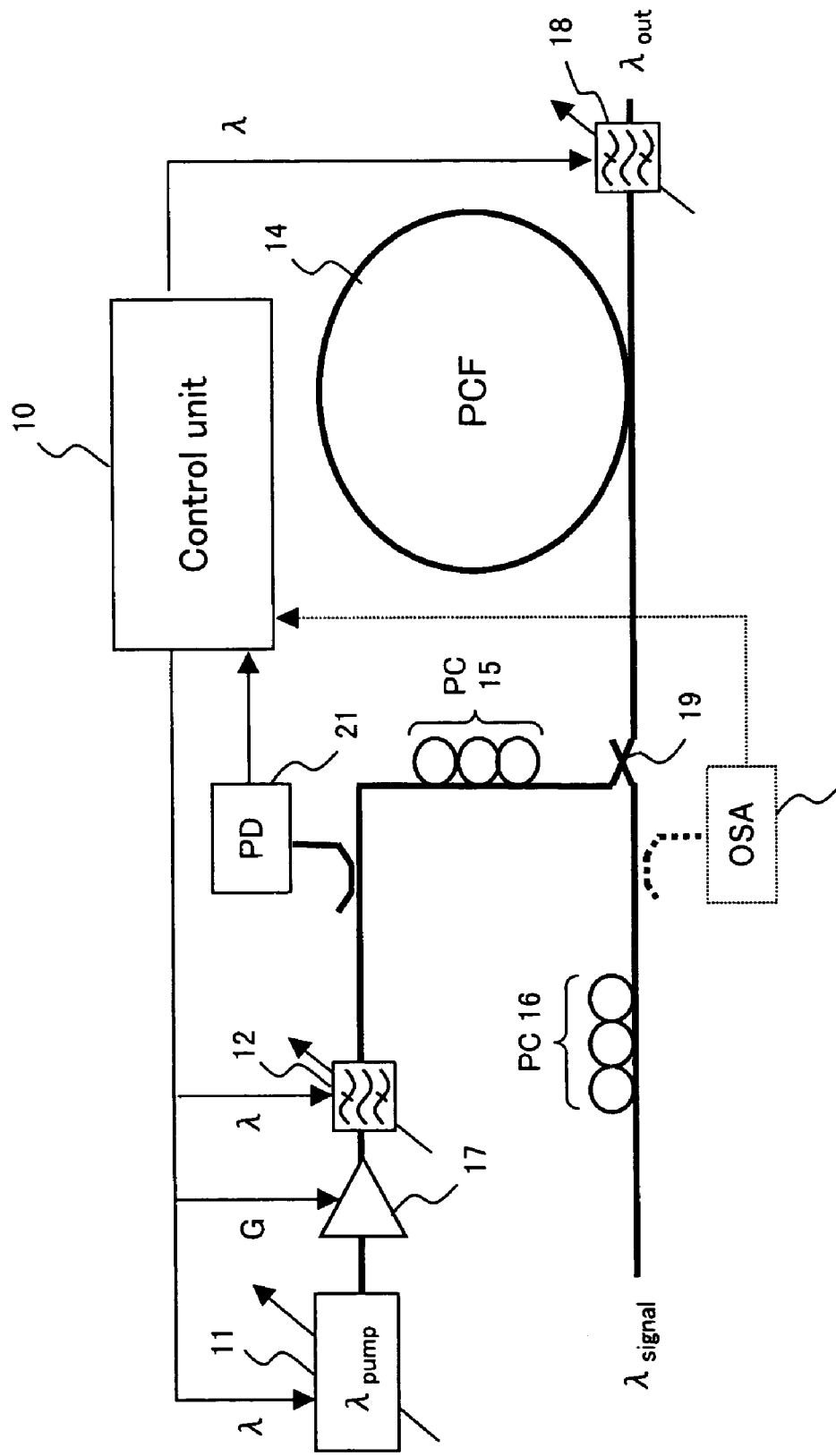
F I G. 7

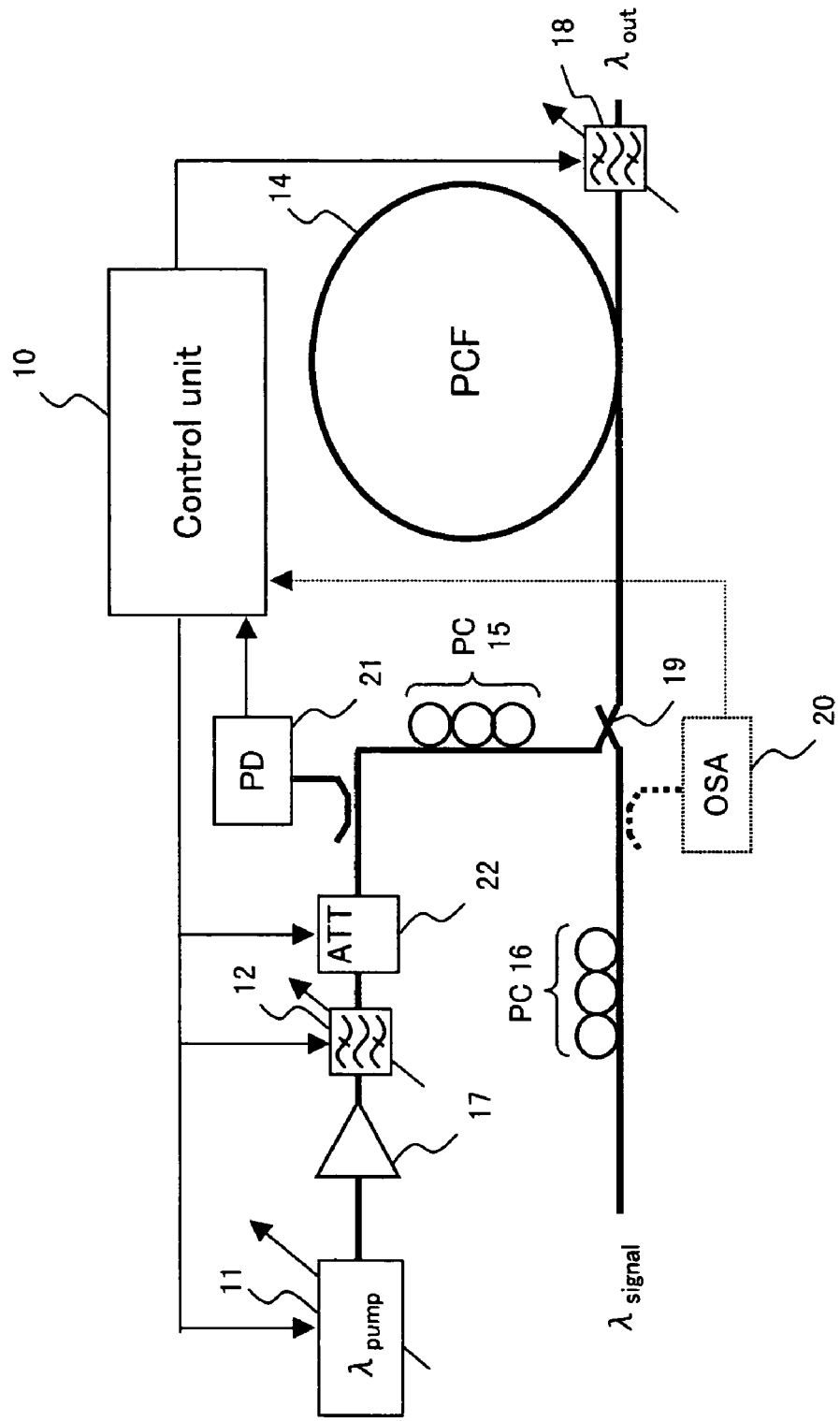
F I G. 8

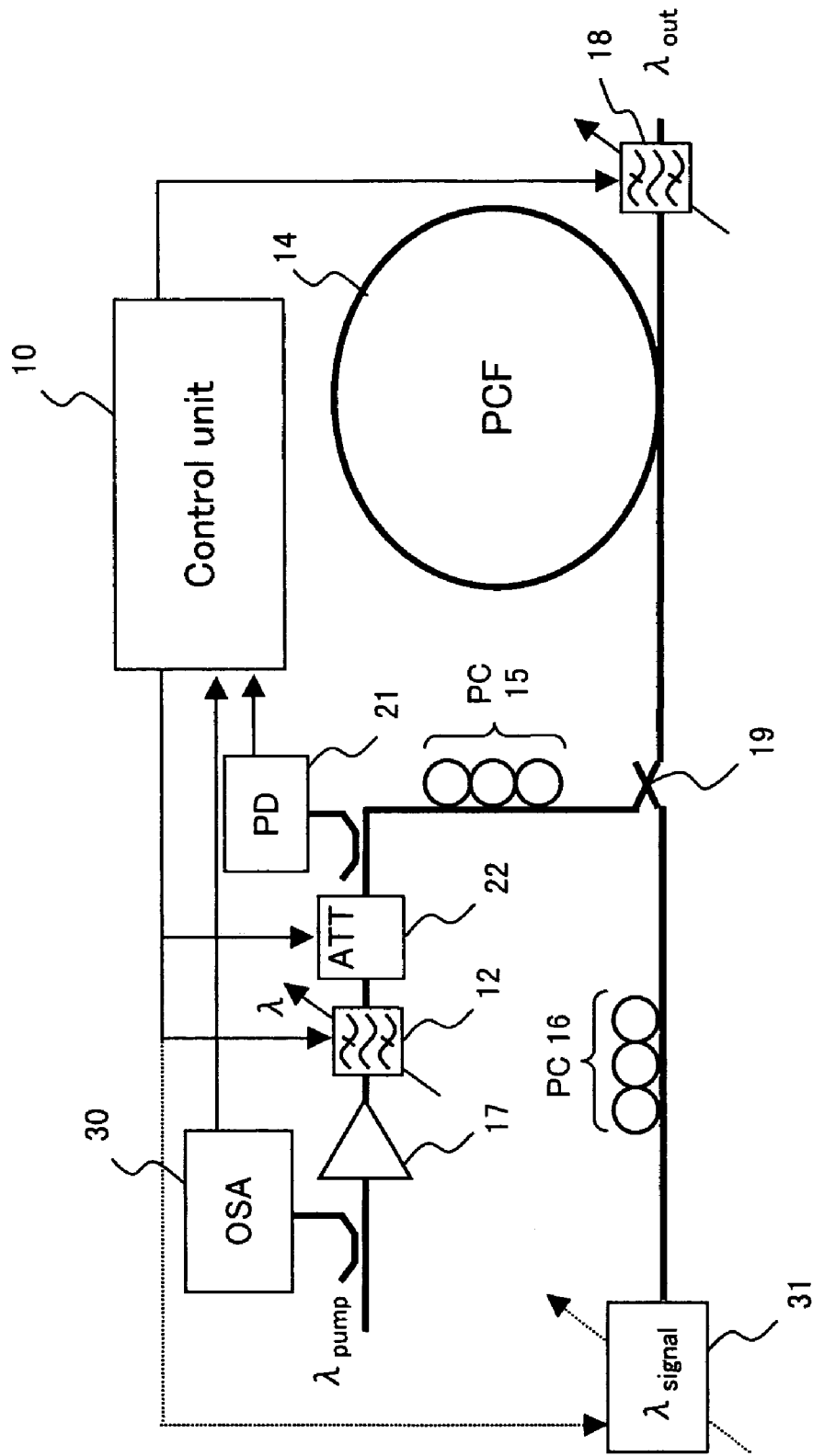
F I G. 12

DEVICE FOR CANCELING THE WAVELENGTH DEPENDENCE OF THE NONLINEARITY COEFFICIENT OF MICROSTRUCTURED FIBERS

BACKGROUND OF THE INVENTION

1. Field of the Invention

The present invention relates to the cancellation of the effects caused by the wavelength dependence of the nonlinearity coefficient of highly nonlinear microstructured fibers in all-optical signal processing applications.

2. Description of the Related Arts

Nonlinear phenomena in optical waveguides (including optical fibers) enable all-optical signal processing, which can overcome many limitations given by conventional signal processing in the electrical domain. These nonlinear phenomena include effects such as self-phase modulation, cross-phase modulation, four wave mixing and Raman amplification.

One of the most promising nonlinear waveguides are small-core microstructured optical fibers, also called photonic crystal fibers (PCFs). The high index contrast between core and cladding in PCFs strongly confines the light in the core region. Thus, a small core and the use of a core material with a high nonlinear refractive index allow the realization of fibers with a nonlinearity coefficient $\gamma$ well above that of conventional highly nonlinear fibers. Increasing the nonlinearity coefficient reduces the length required to achieve a certain magnitude of nonlinearity. This relaxes requirements regarding the chromatic dispersion characteristics, which limit the wavelength range of various all-optical signal processing applications such as cross-phase modulation (see non-patent document 1), four wave mixing (FWM) (see non-patent document 2) and parametric amplification. However, another limitation that so far has not been overlooked arises due to the wavelength dependence of the nonlinearity coefficient.

In the following, equations valid in the case of self-(SPM) and cross-phase modulation (XPM) will be given. The nonlinear phase shift experienced by light of the wavelength $\lambda_i$ propagating through a fiber with the length L is given by (see non-patent document 3), $$\phi(\lambda_i) = b\gamma(\lambda_i,\lambda_j)P_j L_{eff}(\lambda_j) \quad (1)$$

where $P_j$ is the optical input power of the light of the wavelength $\lambda_j$ inducing the nonlinear effect, $L_{eff}$ the effective length, $$L_{eff}(\lambda_j) = \frac{1 - e^{-\alpha(\lambda_j)L}}{\alpha(\lambda_j)} \quad (2)$$

The index i represents the signal light and index j the pump light.

The attenuation $\alpha(\lambda)$ is wavelength dependent. The value of the constant b depends on the type of nonlinear effect (SPM or XPM), as well as on the state and evolution of the polarizations of signal ($\lambda_i$) and pump ($\lambda_j$) light. The nonlinearity coefficient is defined by (see non-patent document 4)

$$\gamma(\lambda_i, \lambda_j) = \frac{2\pi}{\lambda_i} \frac{\iint n_2(x,y)I(x,y,\lambda_i)I(x,y,\lambda_j)dxdy}{\iint I(x,y,\lambda_i)dxdy \iint I(x,y,\lambda_j)dxdy} \quad (3)$$

$$= \frac{2\pi}{\lambda} \frac{\bar{n}_2(\lambda_i,\lambda_j)}{A_{eff}(\lambda_i,\lambda_j)}$$

where $n_2(x,y)$ is the local nonlinear refractive index, $I(x,y,\lambda)$ the optical intensity distribution for a certain wavelength $\lambda$, $$\bar{n}_2(\lambda_i, \lambda_j) = \frac{\iint n_2(x,y)I(x,y,\lambda_i)I(x,y,\lambda_j)dxdy}{\iint I(x,y,\lambda_i)I(x,y,\lambda_j)dxdy} \quad (4)$$

is the average nonlinear refractive index, and $$A_{eff}(\lambda_i, \lambda_j) = \frac{\iint I(x,y,\lambda_i)dxdy \iint I(x,y,\lambda_j)dxdy}{\iint I(x,y,\lambda_i)I(x,y,\lambda_j)dxdy} \quad (5)$$

is the so called effective area.

In the case of FWM the overlap integrals in (3) are taken over spatial field distributions of the four wavelengths involved (see non-patent document 5).

[Non-Patent Document 1]
Photonics Technology Letter vol. 15, no. 3 Mar. 2003 p437
[Non-Patent Document 2]
Photonics Technology letters, vol. 15, no. 3, March 2003 p440
[Non-Patent Document 3]
"Nonlinear fiber optics", Academic Press, 2nd edition, (1995)
[Non-Patent Document 4]
T. Kato, Y. Suetsugu, and M. Nishimura, "Estimation of nonlinear refractive index in various silica-based glasses for optical fibers", Opt. Lett., 20(22): 2279-2281 (1995)
[Non-Patent Document 5]
G. Agrawal, "Nonlinear fiber optics", Academic Press, 2nd edition, (1995) ch. 10, p. 408

FIG. 1 shows a cross sectional view of a square-lattice hole structured photonic crystal fiber.

The wavelength dependence of the nonlinear phase shift is exemplarily studied for XPM in a PCF with a square-lattice hole structure as depicted in FIG. 1. The core is formed by displacing the four center holes outwards by $\delta=0.1\Lambda$. The ratio between the hole-diameter d and the lattice period $\Lambda$ is set to $d/\Lambda=0.9$. The silica glass matrix is assumed to be F-doped with 1 wt-%, which increases the nonlinear refractive index by a factor of 1.4 compared to pure silica [T. Kato, Y. Suetsugu, and M. Nishimura, "Estimation of nonlinear refractive index in various silica-based glasses for optical fibers", Opt. Lett. 20(22): 2279-2281].

In the structure of FIG. 1, light is confined in area A but penetration of light outside the area A occurs. In order to calculate the nonlinear phase shift defined by (1) and (3) a finite element method is employed for determining the optical intensity distribution in the PCF. In this example the wavelength of the signal and the pump light are set less than 2 nm apart. Thus, the intensity distributions of the two wavelengths can be assumed to be identical.

FIG. 2 plots the relative nonlinear phase shift over a range of 40 nm for various lattice periods, which correspond to different core sizes and thus different values of the nonlinearity coefficient. The results reveal that with decreasing core size the wavelength dependence of the relative nonlinear phase shift φ(λ)/φ(1550 nm) increases. For a γ of 72 W$^{-1}$km$^{-1}$ the relative change amounts to 6.5% over a wavelength range of 40 nm.

In the above example, it was assumed that pump and signal wavelength propagate with nearly the same group velocity, i.e., the walk-off between the two wavelengths is negligible. Moreover, it was assumed that the coupling efficiency into the PCF and the transmission loss are wavelength independent.

As described above, in the PCFs, there is wavelength dependence of the nonlinear phase shift. As the nonlinear phase shift corresponds to the efficiency of PCFs as nonlinear device, the difference in nonlinear phase shifts for different wavelengths induces the difference in the efficiency of nonlinear device for different wavelengths, which is made from PCFs. When considering using the PCFs for nonlinear devices in the wavelength division multiplexing (WDM) transmission system, this causes the problem.

SUMMARY OF THE INVENTION

The object of the present invention is to provide a means to cancel out the effect of the wavelength dependence of the highly nonlinear microstructured fibers.

A microstructured optical fiber according to the present invention is a microstructured optical fiber which has a nonlinear refractive index profile in which the nonlinear refractive index increases in outward radial direction from core center.

The first optical signal processing device according to the present invention is an optical signal processing device, comprising: a pump light source; a nonlinear microstructured fiber receiving a pump light and a signal light, and causing nonlinear effect on the signal light depending on an intensity of the pump light; an adjustment unit adjusting the intensity of the pump light; and a control unit controlling the intensity of the pump light by adjusting the adjustment unit so that the wavelength dependence of the nonlinear effect on the signal light is canceled.

The second optical signal processing device according to the present invention is an optical signal processing device, comprising: a pump light source; a nonlinear microstructured fiber receiving a pump light and a signal light, and causing nonlinear effect on the signal light depending on the intensity of the pump light; and an equalizing filter adjusting the resultant signal intensity caused by the wavelength dependence of the nonlinear effect on the signal light.

According to the present invention, the device to cancel out the effect of the wavelength dependence of the highly nonlinear microstructured fibers is provided.

BRIEF DESCRIPTION OF THE DRAWINGS

FIG. 5 shows the first concrete configuration of the second embodiment of the present invention (No. 1).

FIG. 7 shows the first concrete configuration of the second embodiment of the present invention (No. 3).

FIG. 8 shows the first concrete configuration of the second embodiment of the present invention (No. 4).

FIG. 12 shows the third configuration of the second embodiment of the present invention (No. 3).

DESCRIPTION OF THE PREFERRED EMBODIMENTS

The embodiments of the present invention are described in reference to attached figures.

I) The first embodiment solves the problem by reducing the wavelength dependence of the nonlinearity coefficient in the microstructured fiber itself.

As is seen from the equation (1), the nonlinear phase shift depends on the nonlinearity coefficient. Therefore, the appropriate modification of the nonlinearity coefficient reduces wavelength dependence of nonlinear phase shift.

Figure 3:
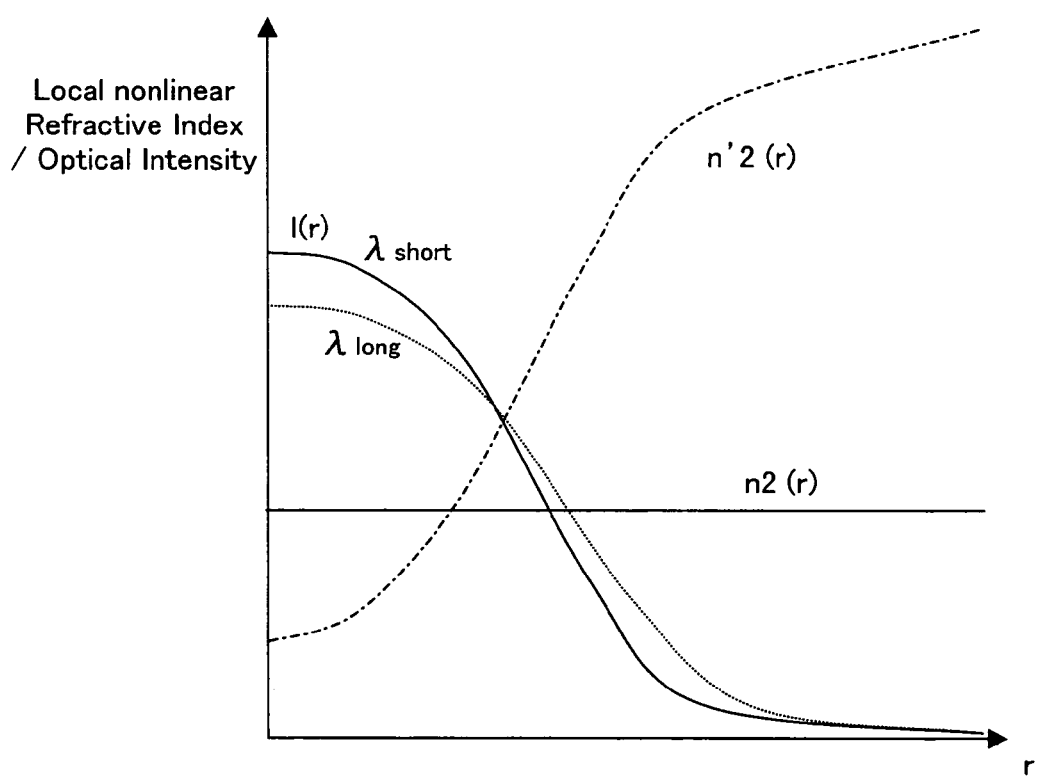
FIG. 3 explains the first embodiment of the present invention (No. 1).
Figure 4:
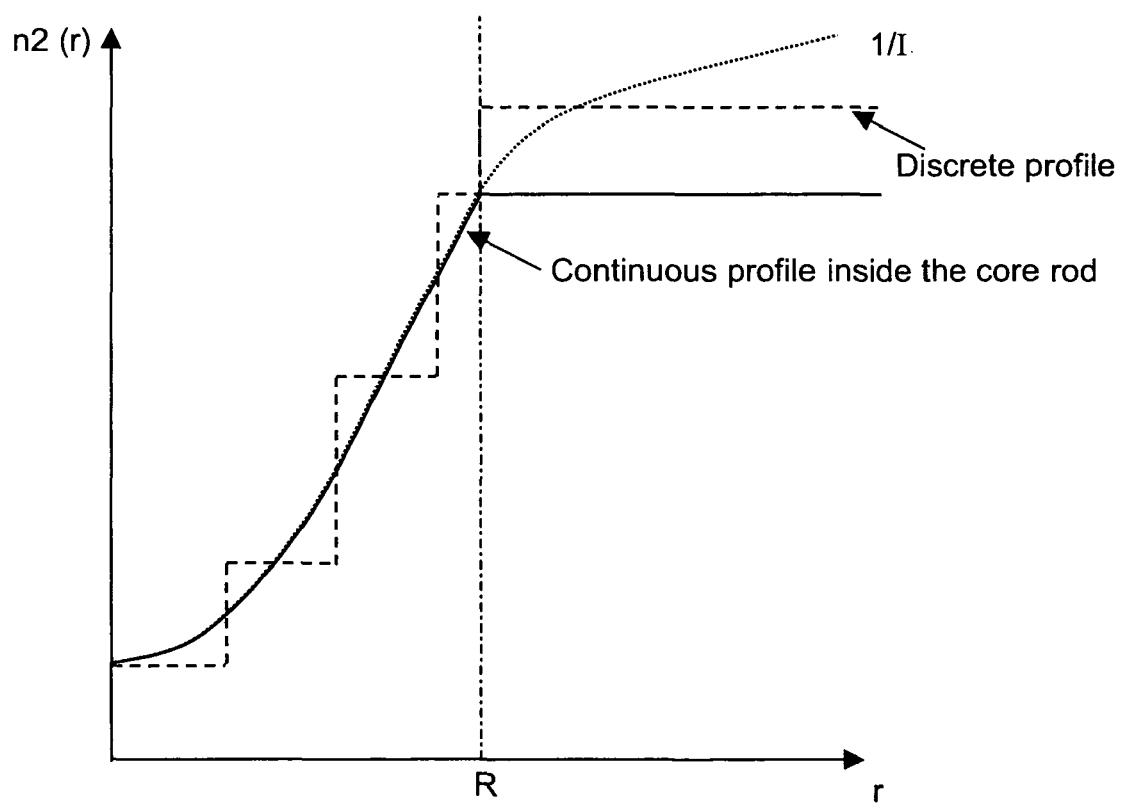
FIG. 4 explains the first embodiment of the present invention (No. 2).

FIGS. 3 and 4 explain the first embodiment of the present invention.

In index-guided optical fibers, the effective area becomes larger with increasing wavelength. Thus, as shown in FIG. 3, by introducing a nonlinear refractive index profile n'$_2$(r) with increasing n'$_2$ in outward direction, the reduction of the intensity in the center can be, at least partly, compensated by the larger n'$_2$ in the regions into which the mode field expands for larger wavelengths.

In order to counterbalance the wavelength dependence of the nonlinear phase shift, the nonlinear refractive index profile has to increase in outward direction. In a silica glass matrix (PCF made of silica with holes arranged in matrix form in cross section), for instance, the nonlinear refractive index can be increased by F- or GeO$_2$-doping (Optical Letters 1995 p2279).

a) A first preferred nonlinear refractive index profile is proportional to the inverse of the intensity distribution of the signal light. Although the intensity distribution in microstructured fiber is not rotationally symmetric, it can be approximated by a rotationally symmetric distribution of Gaussian shape $$I(r, \lambda_i) = I_0 \exp\left(-\frac{r^2}{\omega^2(\lambda_i)}\right)$$

The desirable profile would be $$n_2(r) = n_2(0) \exp\left(\frac{r^2}{\omega^2(\lambda_i)}\right).$$

Figure 1:
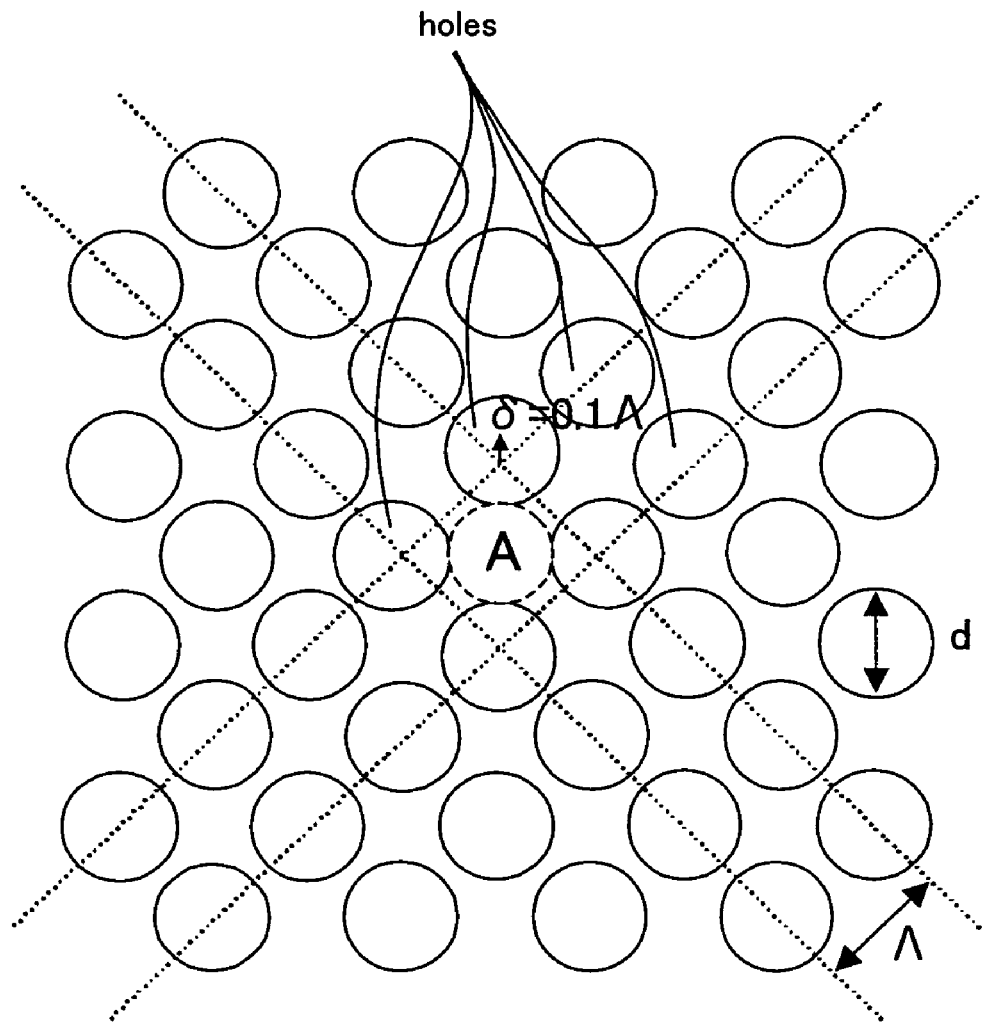
FIG. 1 shows a cross sectional view of a square-lattice hole structured photonic crystal fiber.
Figure 2:
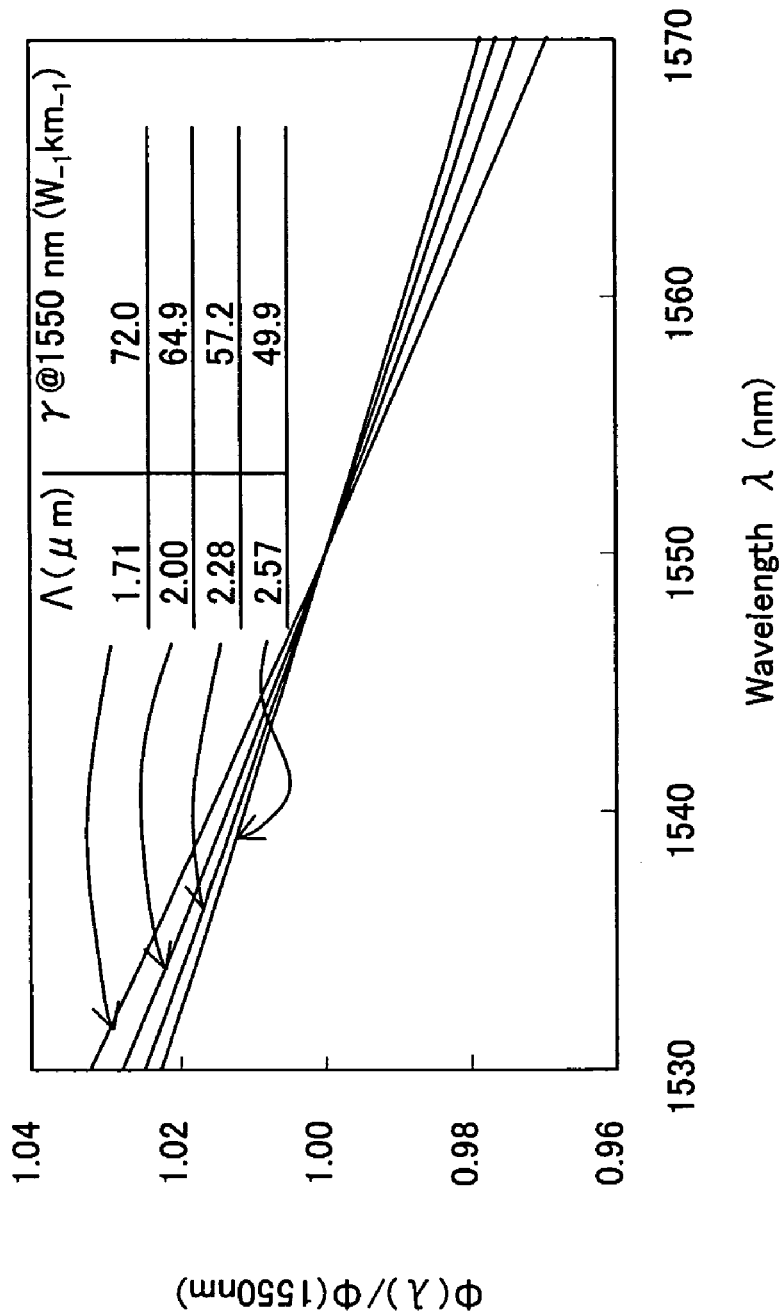
FIG. 2 plots the relative nonlinear phase shift over a range of 40 nm for various lattice periods.

However, microstructured fibers are drawn from preforms that a typically produced by stacking capillaries around a rod. Therefore, this so called stack-and-draw fabrication process does not allow the realization of a continuously increasing nonlinear refractive index profile extending outside the center glass rod of radius R. For this reason, the nonlinear refractive index is kept constant outside the center glass rod region (area A of FIG. 1).

$$n_2(r) = n_2(0) \exp\left(\frac{r^2}{\omega^2(\lambda_i)}\right) \quad (r \le R)$$
$$n_2(r) = n_2(R) \quad (r > R)$$

Let the intensity distribution functions in equation (3) be normalized. Then, the denominator of the equation (3) becomes one. Since the optical power is concentrated in the core region the main contribution to the overlap integral in the numerator of equation (3) comes from this region. Since in this region the local signal intensity multiplied by $n_2$ results in a constant value, the integral approximately reduces to the integration over the pump power intensity, which is one. This nonlinear refractive index profile is preferably used for applications in which $\lambda_s$ is kept constant.

b) A second preferred nonlinear refractive index is proportional to the inverse of the intensity distribution of the pump light.

$$n_2(r) = n_2(0) \exp\left(\frac{r^2}{\omega^2(\lambda_j)}\right) \quad (r \le R)$$
$$n_2(r) = n_2(R) \quad (r > R)$$

where R is the radius of the center rod region.

This nonlinear refractive index profile is preferably used for applications in which $\lambda_p$ is kept constant.

The exponential profile can be approximated by a stepwise increase of the nonlinear refractive index in outward direction.

FIG. 4 shows the desired nonlinear refractive index profile, the profile with a continuous change within the core rod, and the profile with stepwise increase.

Since the achievable change of the nonlinear refractive index increase through F- or $GeO_2$-doping of silica is limited (Optical Letters 1995 p2279), the profile may not be perfectly realized, thus reducing the amount of reduction of the wavelength dependence.

II) The second embodiment solves the problem on a system level by adjusting the input pump power. As is seen from equation (1), the nonlinear phase shift depends on the power of the pump light. Therefore, adjusting the power of the pump light can compensate the wavelength dependence of the nonlinear phase shift. This method is suitable for applications with a single signal wavelength or with a small number of signal wavelengths within a narrow spectral range.

1) FIGS. 5 through 8 show the first concrete configuration of the second embodiment of the present invention.

The first concrete configuration is an all-optical signal processing device employing a highly nonlinear microstructured fiber 14, a local pump light source 11, and a means to adjust the optical pump power in order to compensate for the wavelength dependence of the nonlinearity coefficient. A control unit 10 adjusts the wavelength of the local pump laser 11 and the center wavelength of the ASE filter 12 after the EDFA 17 that boosts the pump light power. In the case of FWM, the control unit 10 also adjusts the center wavelength of the filter 18 placed after the microstructured fiber 14. An optical coupler 19 combines the signal and the pump light before the microstructured fiber 14. The filter 12 passes only the pump light and eliminates noise light such as ASE noise. The filter 18 passes only the output signal light and eliminates all other spectral components. Polarization controllers 15 and 16 adjust polarizations of the pump light and the signal light so that the polarizations of both lights matches because difference of the polarizations of both lights causes adverse effect on efficiency of nonlinear effect in PCF 14. Matching the polarizations of the pump light and the signal light maximizes efficiency of the nonlinear effect in PCF 14, which is preferable.

Figure 6:
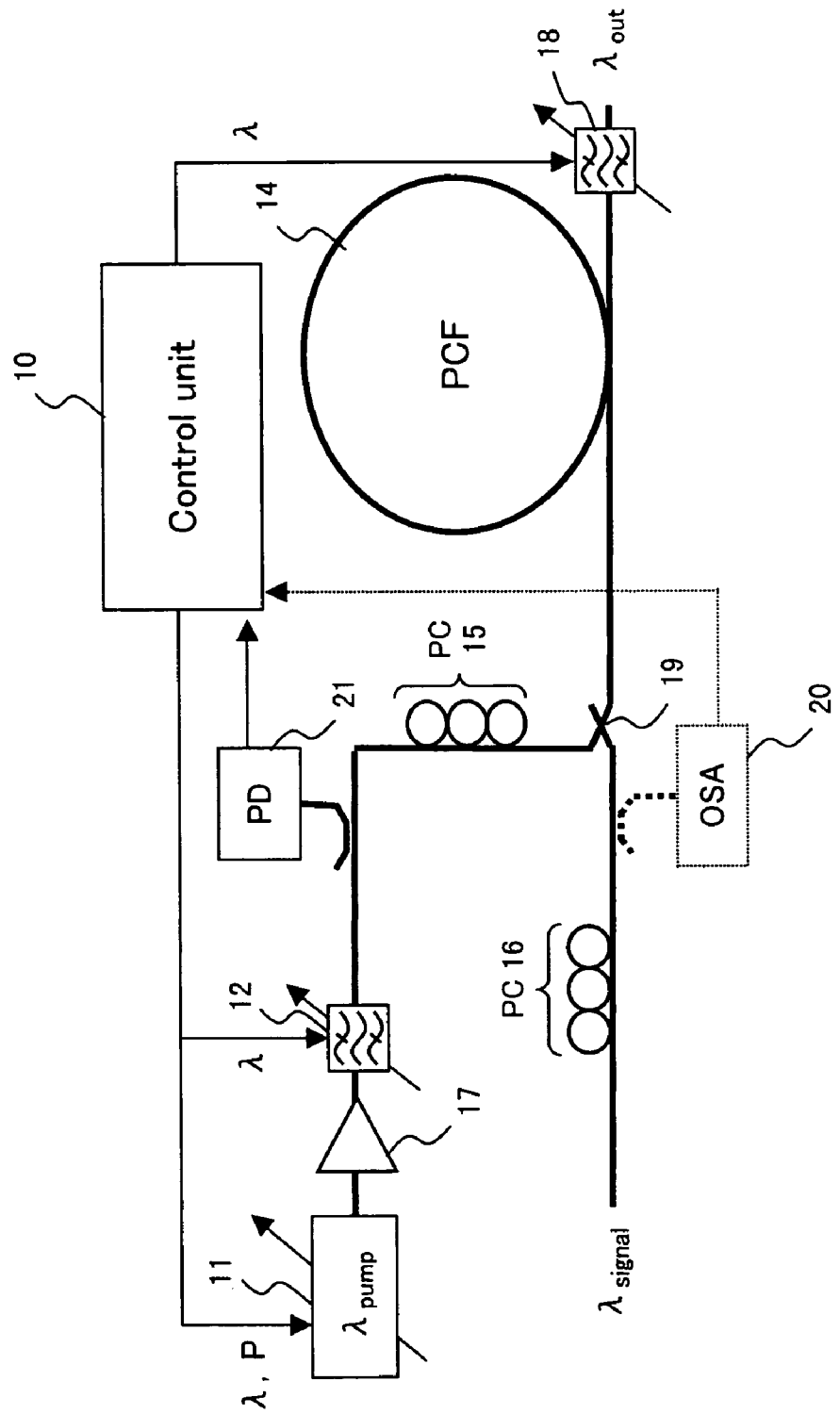
FIG. 6 shows the first concrete configuration of the second embodiment of the present invention (No. 2).

The means to adjust the pump power is either:

a) as in FIG. 5, a static pre-emphasizing filter 13 placed in the optical path between the EDFA 17 and the optical coupler 19: the spectral characteristic of the transmissivity of the pre-emphasizing filter 13 is designed such that the wavelength dependence of the nonlinearity coefficient is compensated by the launched pump power for a given signal wavelength. That is, pre-emphasizing filter 13 attenuates the power of the pump light with an appropriate transmitting characteristics to compensate the wavelength dependence of the nonlinearity coefficient for various wavelengths of the pump light, because, in FIG. 5, the pump light source is a wavelength tunable one.

b1) as in FIG. 6, adjustment of the pump laser output power is conducted by the control unit 10 and the EDFA 17 with constant gain. The control is based on the measurement of the power of the pump light by photodiode 21 and of the wavelength of the signal light by the optical spectrum analyzer 20.

b2) as in FIG. 7, light from the pump light source 11 with constant laser output power are adjusted by EDFA 17 with variable gain controlled by the control unit 10.

b3) as in FIG. 8, light from the pump light source 11 with constant laser output power are amplified by the optical amplifier 17 with constant amplifier gain. The control of the power of the pump light is conducted by a variable attenuator 22 adjusted by the control unit 10.

In configurations b1-b3 the adjustment of the pump power is based on the information in a look-up table (LUT) that contains the required pump power data as a function of $\lambda_{pump}$. Moreover, in configurations b1-b3 an optical tap coupler splits a part of the pump light to a photodiode 21 in order to monitor the pump light power and provide a feedback signal to the control unit 10.

Figure 9:
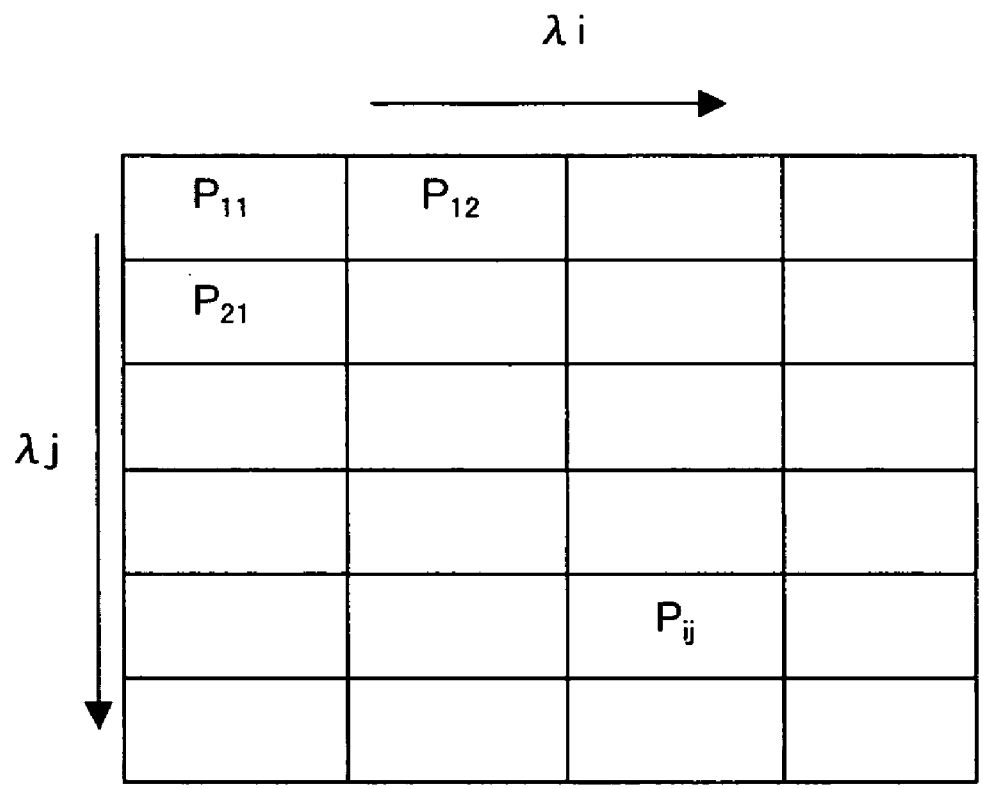
FIG. 9 a schematic diagram of a look-up table stored in the control unit 10.

FIG. 9 is a schematic diagram of a look-up table stored in the control unit 10.

The dependence of the nonlinear phase shift on the pump and signal wavelength can be either evaluated experimentally or calculated on the basis of the structure of the microstructured fiber employing equation (1)-(3).

From the obtained information, the pump power that is required to compensate for the wavelength dependence of the nonlinear phase shift is derived and the resulting data summarized either in a look-up table of FIG. 9 or in a fitting function $P=P(\lambda_s,\lambda_p)$. In the case of a LUT, the wavelengths stored in the table are allocated on the ITU-grid in the specified operational wavelength region of the all-optical signal processing device. In the case of the fitting function a microprocessor calculates the value for a certain combination of $(\lambda_s,\lambda_p)$ and the coefficients of the fitting function are pre-stored.

2) The second configuration is an extension of the configurations b1-b3 of the first configuration of the second embodiment.

A part of the signal light is coupled to an optical spectrum analyzer 30 in order to detect the signal wavelength and provide the information to the control unit 10. The control unit 10 adjusts the optical power of the pump light on the basis of the information in a look-up table that contains the required pump power data as a function of $\lambda_{pump}$ and $\lambda_{signal}$. The control unit 10 also adjusts the center wavelength of the filter 18 placed after the microstructured fiber 14 as a function of $\lambda_{pump}$ and $\lambda_{signal}$ (FWM) and as a function of $\lambda_{signal}$ (XPM).

Figure 10:
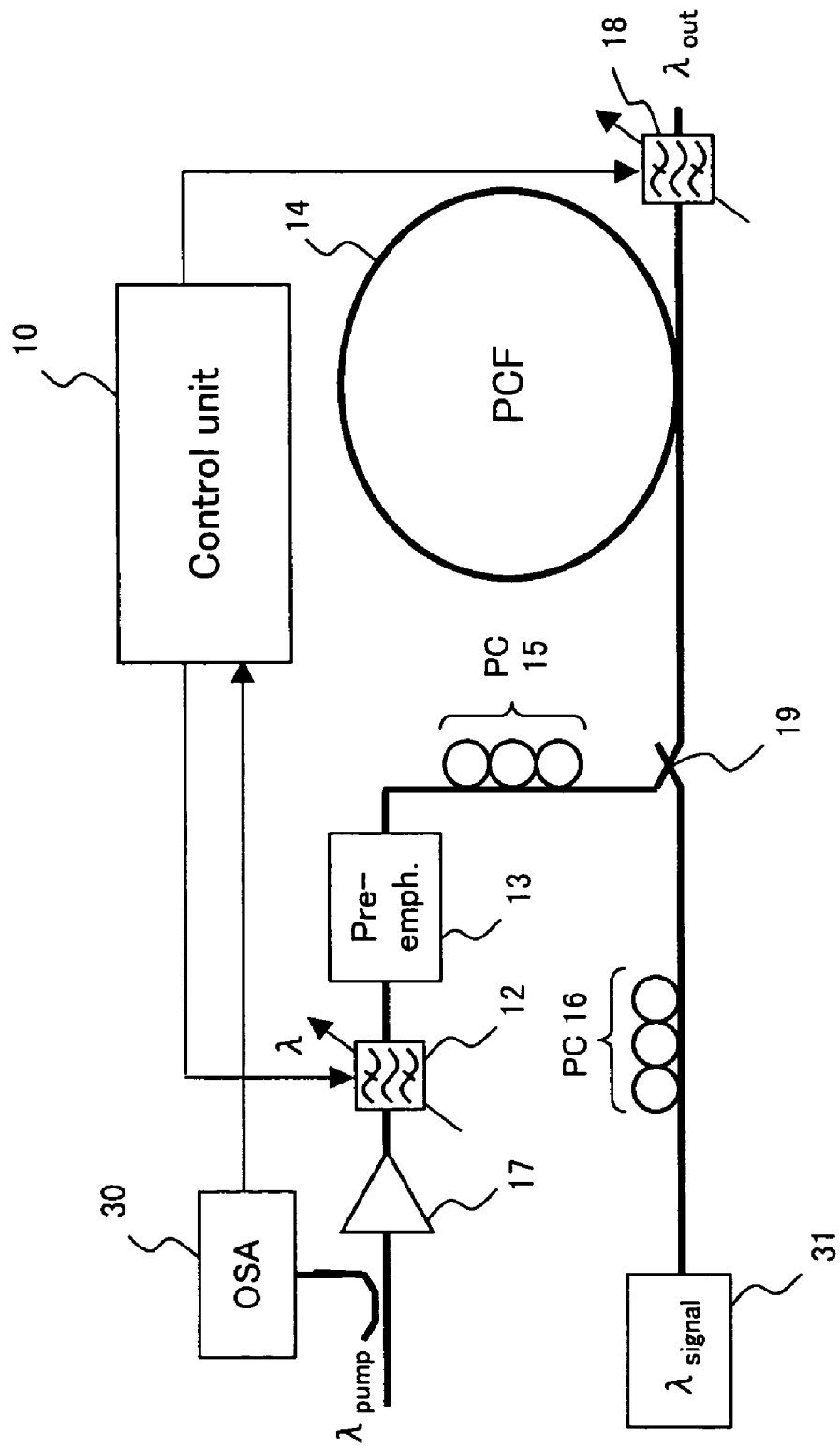
FIG. 10 shows the third configuration of the second embodiment of the present invention (No. 1).
Figure 11:
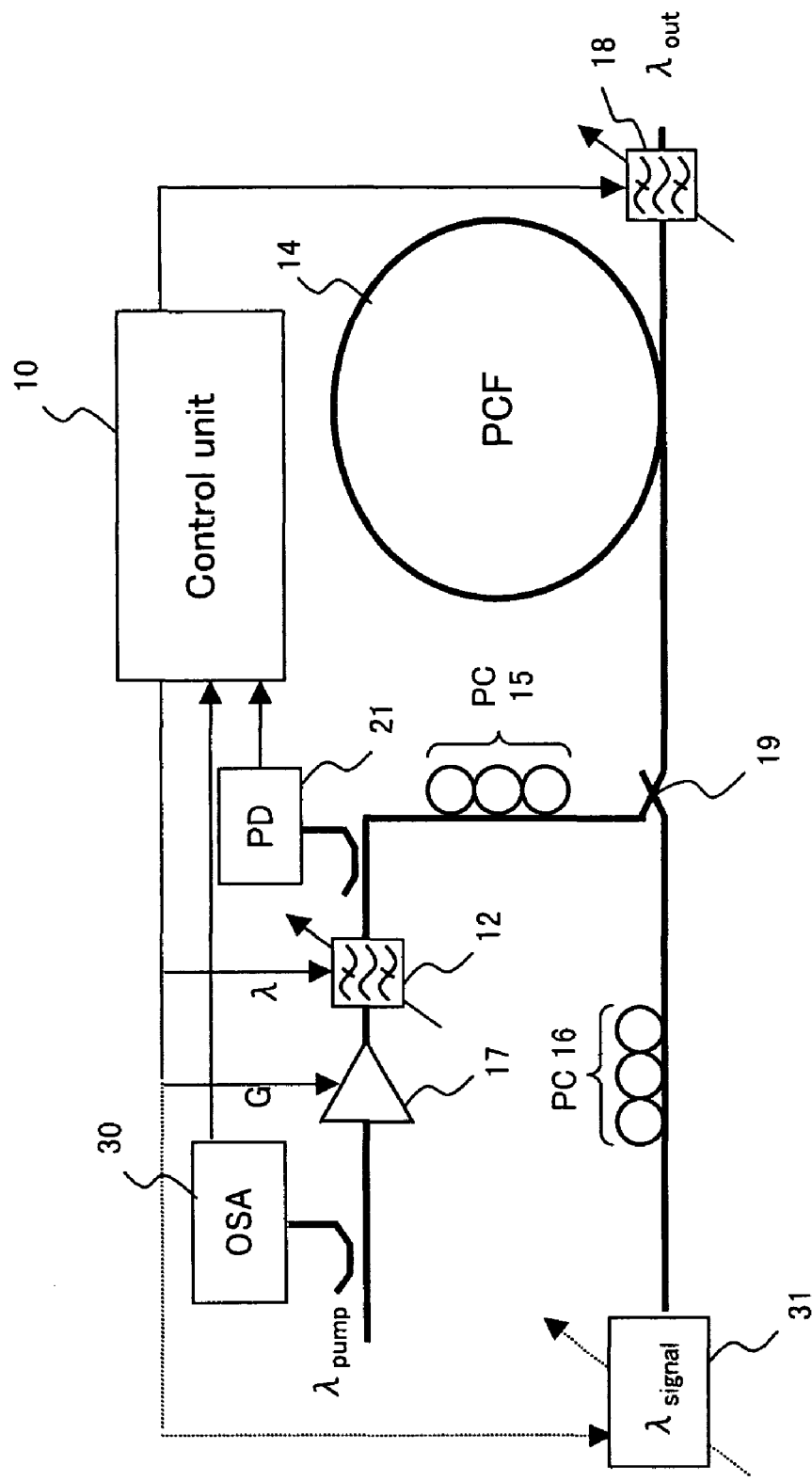
FIG. 11 shows the third configuration of the second embodiment of the present invention (No. 2).

FIGS. 10 through 12 show the third configuration of the second embodiment of the present invention. In these figures, like numbers are attached to like elements in the figures of the first configuration.

3) The third configuration is an all-optical signal-processing device employing a highly nonlinear microstructured fiber 14, and a means to adjust the optical pump power in order to compensate for the wavelength dependence of the nonlinearity coefficient. A part of the incoming light, which is used as pump light, is coupled to an optical spectrum analyzer 30 in order to detect the wavelength and provide the information to the control unit 10. The control unit 10 adjusts the center wavelength of the ASE filter 12 after the EDFA 17 that boosts the pump light power. In the case of FWM, the control unit 10 also adjusts the center wavelength of the filter 18 placed after the microstructured fiber. An optical coupler 19 combines the signal and the pump light before the microstructured fiber.

The means to adjust the pump power is either:

a) as in FIG. 10, the power of the pump light is adjusted by the pre-emphasizing filter 13. As the other elements are the same as that in FIG. 5, the detailed explanation is omitted.

b1) As in FIG. 11, the power of the pump light is adjusted by the EDFA 17 by changing the gain of the EDFA 17 under the control of the control unit 10. Further, the wavelength of the signal light is variable in this case. The wavelength of the signal light is adjusted by the control unit 10 and simultaneously the pass wavelength of filter 18 is also adjusted to pass the signal light. The other explanations are omitted as this configuration is similar to that of FIG. 7.

b2) as in FIG. 12, the power of the pump light is adjusted by the optical attenuator 22 under the control of the control unit 10. The other explanations are omitted as this configuration is similar to that of FIG. 8 and FIG. 11.

In cases b1-b2 the adjustment is based on the information in a look-up table that contains the required pump power data as a function of $\lambda_{pump}$. Moreover, in the configurations b1-b2 an optical tap couples a part of the pump light to a photodiode in order to monitor the pump light power and provide a feedback signal to the control unit 10.

4) The fourth configuration is an extension of the configuration b1-b2 of the second embodiment. In this configuration, the signal laser light source is wavelength tunable. The control unit adjusts the signal wavelength; moreover, it adjusts the optical power of the pump light on the basis of the information in a look-up table that contains the required pump power data as a function of $\lambda_{pump}$ and $\lambda_{signal}$. The control unit also adjusts the center wavelength of the filter placed after the microstructured fiber as a function of $\lambda_{pump}$ and $\lambda_{signal}$ (FWM) and as a function of $\lambda_{signal}$ (XPM).

Figure 13:
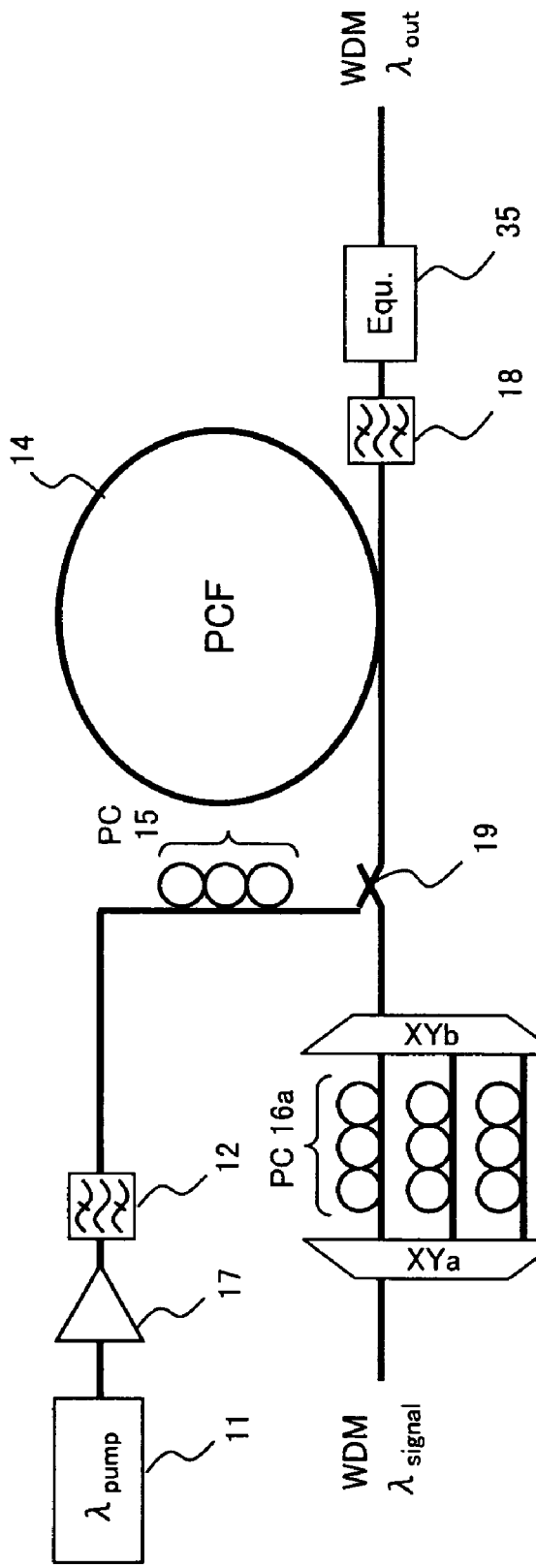
FIG. 13 shows the configurations of the third embodiment of the present invention (No. 1).
Figure 14:
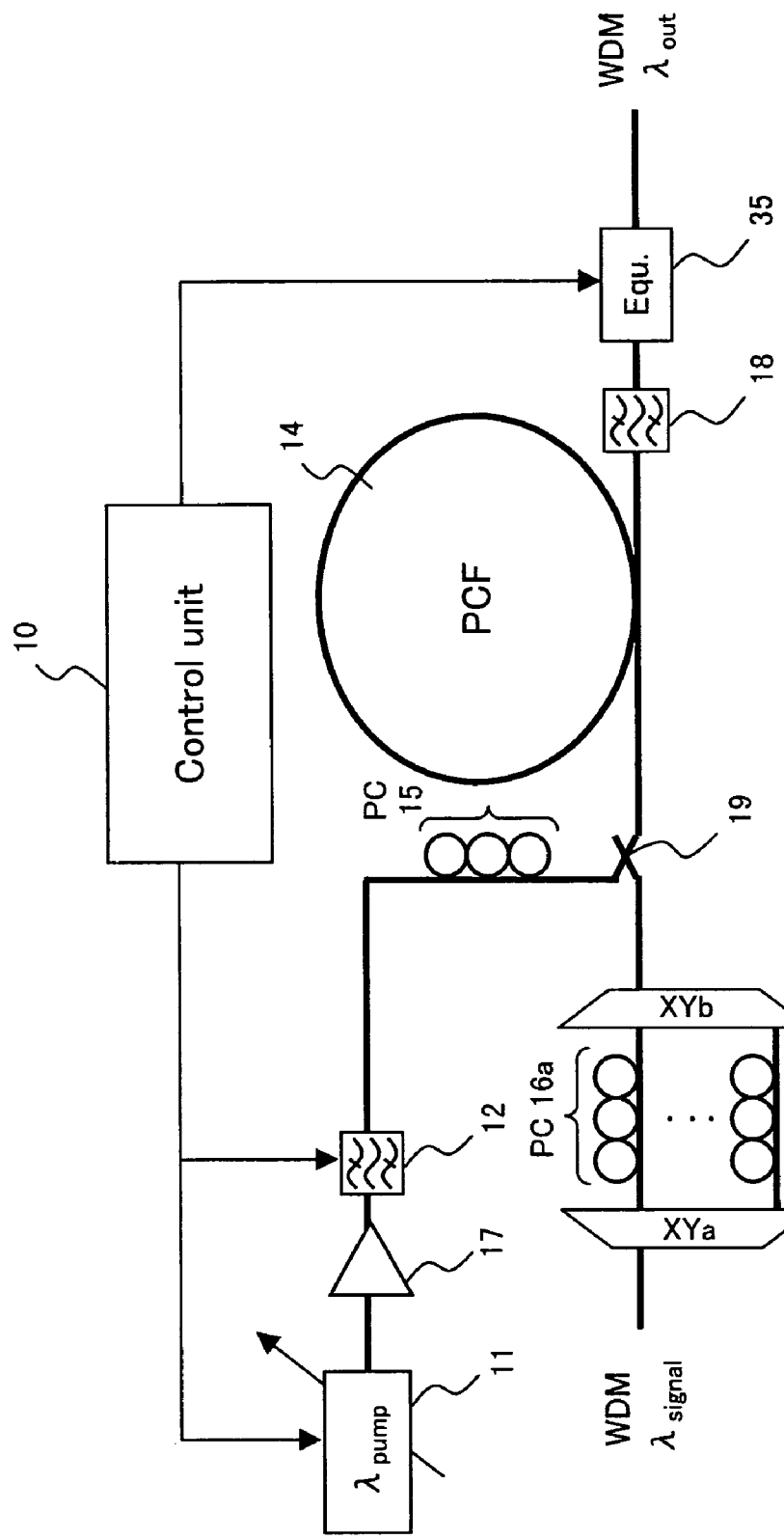
FIG. 14 shows the configurations of the third embodiment of the present invention (No. 2).

FIGS. 13 and 14 show the configurations of the third embodiment of the present invention.

III) The third embodiment solves the problem on a system level, by adjusting the output power by means of an equalizing filter at the output of the highly nonlinear microstructured fiber.

In the third embodiment, the signal light is a WDM signal including a plurality of wavelengths. The WDM signal light is demultiplexed into each wavelength by a wavelength demultiplexing device XYa. The polarization of the light of each wavelength is adjusted independently to each other by means of polarization controllers 16a in order to maximize the efficiency of the nonlinear effect in microstructured fiber 14. Then, the WDM signal lights are multiplexed by means of a wavelength multiplexing device XYb. The pump light emitted from the pump light source 11 is amplified by EDFA 14 and passes through filter 12. Next, its polarization is adjusted. Then, the pump light is coupled together with the signal lights and inputted to PCF 14. The magnitude of the nonlinear effect in PCF 14 is different for each signal wavelength, resulting in a difference in intensity of each signal wavelength. Therefore, the intensity of each wavelength of the WDM light after affected by the nonlinear effect in PCF 14 is made constant by the equalizing filter 35 after passing through the filter 18. By eliminating the result of the wavelength dependency of the nonlinear effect in PCF 14 (difference in intensity of each wavelength), a virtually wavelength independent operation of the signal processing device is obtained.

1) In the first configuration of the third embodiment, as in FIG. 13, an equalizing filter 35 is placed at the output of the PCF 14 in order to compensate for the wavelength dependence of the nonlinearity coefficient.

2) In the second configuration of the third embodiment, as in FIG. 14, the pump wavelength and the equalizing filter 35 are adjustable. The spectral characteristic of the transmissivity of the equalizing filter 35 is adapted such that the resulting power tilt of the output spectrum due to the wavelength dependence of the nonlinearity coefficient is canceled.

Figure 15:
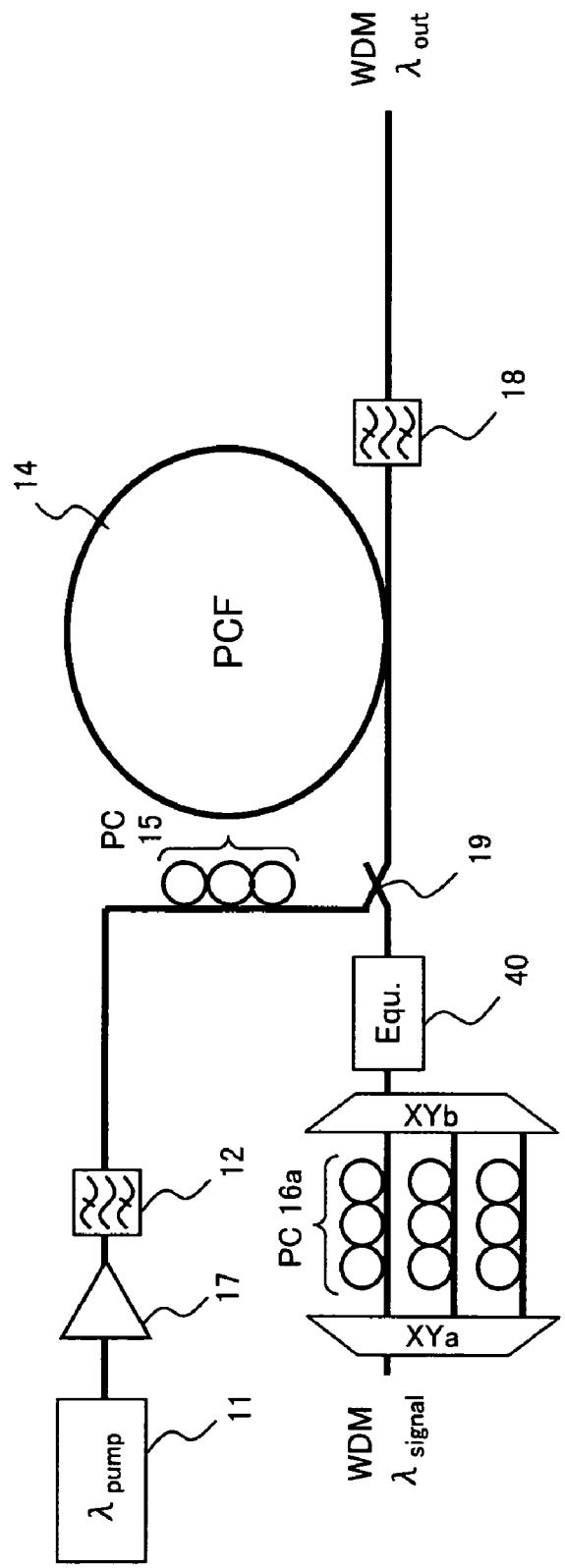
FIG. 15 shows the configurations of the fourth embodiment of the present invention (No. 1).
Figure 16:
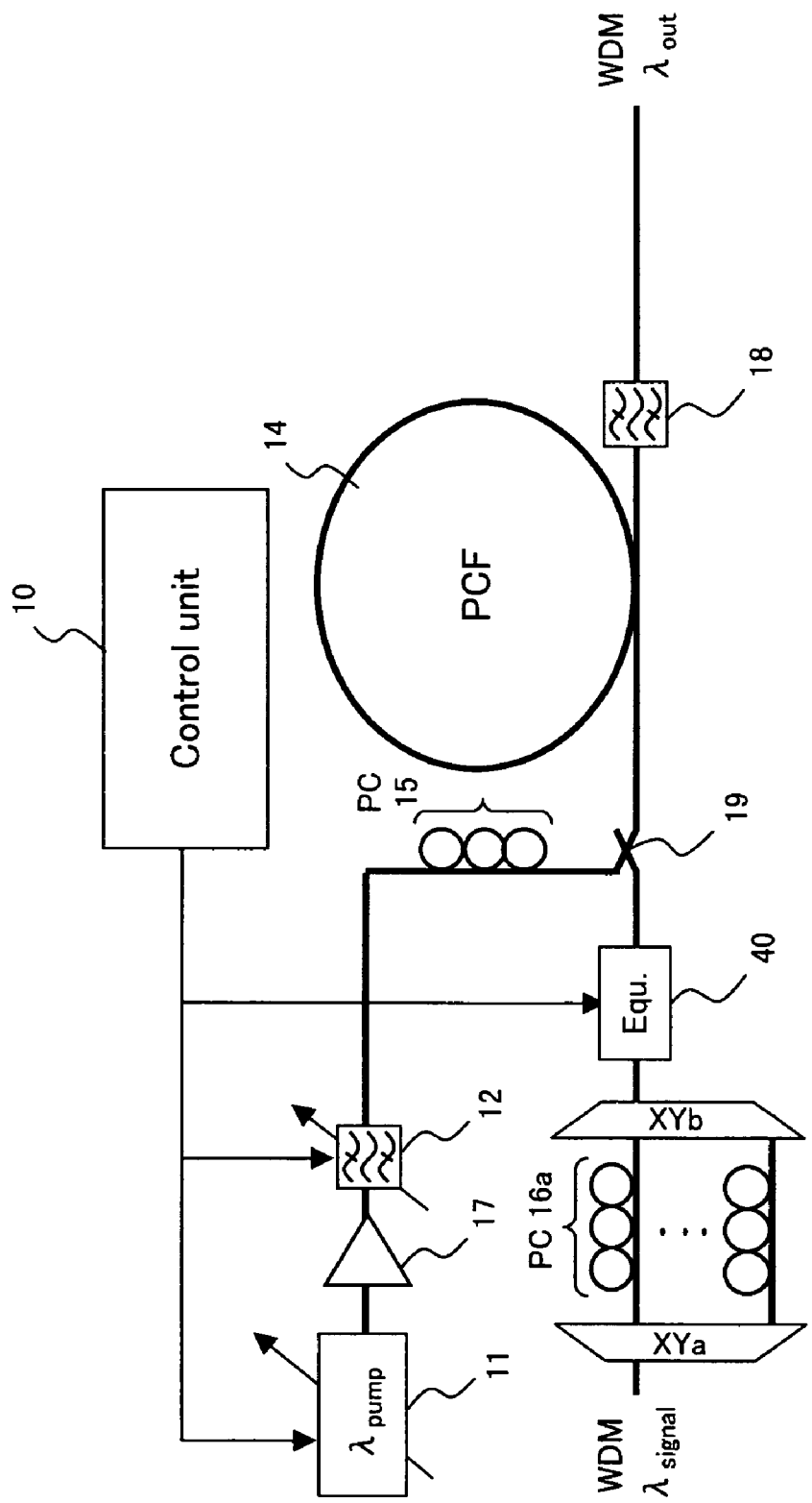
FIG. 16 shows the configurations of the fourth embodiment of the present invention (No. 2).

FIGS. 15 and 16 show the configurations of the fourth embodiment of the present invention.

IV) The fourth embodiment solves the problem on a system level, by adjusting the signal input powers by means of an equalizing filter 40 at the input of the highly nonlinear microstructured fiber. Based on the fact that the intensity of output light from PCF 14 is linearly proportional to the intensity of input light to PCF 14, the intensity of input light is adjusted by the equalizing filter 40 before PCF 14.

1) In the first configuration of the fourth embodiment, as in FIG. 15, a equalizing filter 40 is placed at the input of the highly nonlinear microstructured fiber 14 before the coupler 19 in order to compensate for the wavelength dependence of the nonlinearity coefficient. The other components are similar to that of FIG. 13. Therefore, further explanations are omitted.

2) In the second configuration of the fourth embodiment, as in FIG. 16, the pump wavelength and the equalizing filter 40 are adjustable. The spectral characteristic of the transimssivity of the equalizing filter 40 is adapted such that the resulting power tilt of the output spectrum due to the wavelength dependence of the nonlinearity coefficient is canceled. The other components are similar to that of FIG. 14. Therefore, further explanations are omitted.

What is claimed is:

1. A microstructured optical fiber which has a nonlinear refractive index profile proportional to a light intensity in which the nonlinear refractive index of a core increases in an outward radial direction from the center of the core, the nonlinear refractive index profile having a shape of an inverse of intensity distribution of a pump light or a signal light in cross section.

2. The microstructured optical fiber according to claim 1, wherein
the nonlinear refractive index profile becomes constant at an outside radial region from a predetermined radius in cross section.

3. The microstructured optical fiber according to claim 1, wherein
the nonlinear refractive index increases stepwise in outward radial direction from the core center.

4. An optical signal processing device, comprising:
a pump light source;
a nonlinear microstructured fiber receiving a pump light and a signal light, and causing nonlinear effect on the signal light depending on an intensity of the pump light;
an adjustment unit adjusting an intensity of the pump light; and
a control unit controlling an intensity of the pump light by adjusting the adjustment unit so that a wavelength dependence of the nonlinear effect on the signal light is canceled.

5. The optical signal processing device according to claim 4, wherein
the adjustment unit is a pre-emphasizing filter.

6. The optical signal processing device according to claim 4, wherein
the adjustment unit is an optical amplifier.

7. The optical signal processing device according to claim 4, wherein
the adjustment unit is an optical attenuator.

8. The optical signal processing device according to claim 4, wherein
the control unit controls an intensity of the pump light based on data in a look-up table containing a required power as a function of the signal wavelength and the pump wavelength.

9. The optical signal processing device according to claim 8, further comprising:
an optical spectrum analyzer monitoring the signal wavelength or the pump wavelength in order to provide information on the signal wavelength or the pump wavelength to the control unit.

10. The optical signal processing device according to claim 4, wherein
the control unit controls the intensity of the pump light based on data obtained from a predetermined function describing a required power as a function of the signal wavelength and the pump wavelength.

11. The optical signal processing device according to claim 10, further comprising:
an optical spectrum analyzer monitoring the signal wavelength or the pump wavelength in order to provide information on the signal wavelength or the pump wavelength to the control unit.

12. An optical signal processing device, comprising:
a pump light source;
a nonlinear microstructured fiber receiving a pump light and a signal light, and causing nonlinear effect on the signal light depending on an intensity of the pump light; and
an equalizing filter adjusting a resultant signal intensity caused by a wavelength dependence of the nonlinear effect on the signal light.

13. The optical signal processing device according to claim 12, wherein
the equalizing filter is an adjustable filter of a spectral characteristic of transmissivity, and
further comprising:
a control unit controlling the spectral characteristic of transmissivity of the equalizing filter so that a tilt of an output signal from the nonlinear microstructured fiber caused by the wavelength dependence of the nonlinear effect on the signal light is canceled.

14. The optical signal processing device according to claim 13, wherein
the control unit controls the tilt of the output signal from the microstructured fiber based on data in a look-up table containing a required power as a function of the signal wavelength and the pump wavelength.

15. The optical signal processing device according to claim 13, wherein
the control unit controls the tilt of the input signal from the microstructured fiber based on data in a look-up table containing a required power as a function of the signal wavelength and the pump wavelength.

16. The optical signal processing device according to claim 13, wherein
the control unit controls a tilt of the output signal from the microstructured fiber based on data obtained from a predetermined function describing a required power as a function of the signal wavelength and the pump wavelength.

17. The optical signal processing device according to claim 13, wherein
the control unit controls the tilt of the input signal from the microstructured fiber based on data obtained from a predetermined function describing a required power as a function of the signal wavelength and the pump wavelength.

18. The optical signal processing device according to claim 12, wherein
the equalizing filter is placed at the output side of the nonlinear microstructured fiber.

19. The optical signal processing device according to claim 12, wherein
the equalizing filter is placed at the input side of the nonlinear microstructured fiber.

* * * * *